United States Patent
Kawasaki et al.

(10) Patent No.: US 6,290,117 B1
(45) Date of Patent: Sep. 18, 2001

(54) FRICTION STIR WELDING METHOD AND FRICTION STIR WELDING APPARATUS

(75) Inventors: Takeshi Kawasaki, Kudamatsu; Toshiaki Sagawa, Yanai; Masakuni Ezumi, Kudamatsu, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/275,028

(22) Filed: Mar. 24, 1999

Related U.S. Application Data (63) Continuation-in-part of application No. 09/025,070, filed on Feb. 17, 1998, now Pat. No. 6,050,474.

(30) Foreign Application Priority Data

Mar. 26, 1998 (JP) .................................................. 10-078823

(51) Int. Cl.$^7$ ............................. B23K 20/12; B23K 37/00
(52) U.S. Cl. ......................................... 228/112.1; 228/2.1
(58) Field of Search .................................. 228/112.1, 125, 228/2.1, 2.3, 45, 114.5, 119, 234.1; 156/73.5

(56) References Cited

U.S. PATENT DOCUMENTS

| | | | |
|---|---|---|---|
| 3,266,701 | * | 8/1966 | Peignen ................................ 228/27 |
| 4,667,082 | * | 5/1987 | Shibata et al. .................. 219/124.34 |
| 5,713,507 | * | 2/1998 | Holt et al. ......................... 228/112.1 |
| 5,813,592 | | 9/1998 | Midling et al. . |
| 5,864,115 | * | 1/1999 | Ikeda et al. ....................... 219/130.21 |
| 6,029,879 | * | 2/2000 | Cocks ..................................... 228/2.1 |
| 6,050,474 | * | 4/2000 | Aota et al. . |

FOREIGN PATENT DOCUMENTS 2306366   5/1997 (GB) .
96/38256  12/1996 (WO) .

* cited by examiner

Primary Examiner—Tom Dunn
Assistant Examiner—Jonathan Johnson
(74) Attorney, Agent, or Firm—Antonelli, Terry, Stout & Kraus, LLP (57) ABSTRACT

End portions of extruded frame members 50 and 60 have increased thickness portions 56 and 66 which project toward an outer side thereof. A rotary body 70 is inserted into the increased thickness portions 56 and 66 and is rotated so as to carry out friction stir welding of the frame members. A large diameter portion 71 of the rotary body 70 is inserted to a position between the apex of the increased thickness portion and an extension line of an outer face of the plates 51 and 61 of the extruded frame members 50 and 60 as the rotary body 70 is rotated. Further, the rotary body 70 is reciprocated in a direction orthogonal to the welding line as it is moved along the welding line. Accordingly, friction stir welding can be carried out fully. In the friction stir welding, due to a rotation of the rotary body 70, even when a gap g between two extruded frame members to be subjected to welding is large, it is possible to carry out the friction stir welding.

6 Claims, 5 Drawing Sheets

FRICTION STIR WELDING METHOD AND FRICTION STIR WELDING APPARATUS

This application is a Continuation-in-Part application of prior application Ser. No. 09/025,070, filed Feb. 17, 1998, now U.S. Pat. No. 6,050,474, issued Apr. 18, 2000.

BACKGROUND OF THE INVENTION

The present invention relates to a friction stielding method and a friction stir welding apparatus; and, in particular, the present invention to a friction stir welding method and a friction stir welding apparatus to be used, for example, in welding an aluminum alloy frame member etc. for use in a side body structure of a car body in a railway vehicle.

A friction stir welding method is a method in which a round rod (referred to hereinafter as a rotary body) is rotated and inserted in a welding portion to be subjected to welding, and then the rotating body is moved along a welding line. The material which exists in the welding portion is exothermally heated and softened and is further elastically fluidized by the rotating body, and the fluidized material effects a solid phase welding according to the friction stir welding method.

The rotary body used in the friction stir welding method and in the apparatus for carrying out friction stir welding comprises a small diameter portion which is inserted fully into the welding portion of the members to be subjected to welding and a large diameter portion which is positioned adjacent the small diameter portion, and this large diameter portion of the rotary body is also inserted to a small extent into the welding portion. The small diameter portion and the large diameter portion of the rotary body are arranged integrally on the same axis, so that both the small diameter portion and the large diameter portion of the rotary body are rotated together. A boundary face portion between the small diameter portion and the large diameter portion of the rotary body is inserted also to a small extent into the welding portion to be subjected to welding.

In general, a gap is formed between side vertical wall portions of two welding members to be welded. The material which exists in the welding portion to be subjected to welding in the gap is blown off and the material surrounding the gap becomes thin. Accordingly, an end portion of the welding member to be welded is formed with an increased thickness portion, namely, the welding member to be welded has an increased thickness portion at the end thereof. This friction stir welding technique, as applied to two members to be welded having an increased thickness portion at the end thereof, is disclosed in Japanese application announcement publication No. Hei 7-505090 (EP 0615480 B1), "Welding & Metal Fabrication" January 1995, pages 13, 14 and 16, and EP 0797043 A2.

Further, the material of the member to be welded is described in the above stated Japanese application announcement publication No. Hei 7-505090. As to the material to be subjected to welding, the material, size, rotation speed, and moving speed of the rotary body is disclosed in "Study of Friction Stir Welding" at Welding Association Japan Meeting Symposium Summary: No. 56 ('95-4), pages 208 and 209.

The friction stir welding technique is one welding method in which the material of the member to be subjected to welding is softened and welded, but there is no supplement of the metal in this process. Accordingly, in the case where two abutting members are welded, when in the area of the gap formed between the two members, the thickness of a welding portion will become thin. In the above stated EP 0797043 A2, providing an increased thickness of the members to be welded in the welding portion to be subjected to welding, the metal from the increased thickness portion is used to supplement the supply of metal to the gap during the welding process.

However, when the size (horizontal width) of the gap formed between the two members to be welded is larger than the diameter of the small diameter portion of the rotary body, it is impossible to properly carry out the friction stir welding. Even when the size of the gap is smaller than the diameter of the small diameter portion of the rotary body, the friction stir welding will become insufficient if the size of the gap is nearly equal to the diameter of the small diameter portion of the rotary body.

The size of the gap is determined easily by the manufacturing accuracy of the members to be welded. In particular, for example, in a case where a side body structure of a car body of a railway vehicle is manufactured by welding aluminum alloy along the longitudinal length of extruded frame members, when an attempt is made, to weld the long frame members, since the size of the gap may be large, the friction stir welding becomes difficult. When the member to be welded is long in length, since the manufacturing accuracy of the welding portion of the members to be welded becomes significant, the management of the size of the gap becomes difficult, with a result that the friction stir welding technique becomes difficult.

Further, the problem of gap size is effected by the accuracy of fixing the members to be welded to a frame stand. In this regard, the longitudinal length of the extruded frame member for the side body structure of the car body of the railway vehicle is about from 20 m to 25 m.

SUMMARY OF THE INVENTION

An object of the present invention is to provide a friction stir welding method and a friction stir welding apparatus wherein, even when the size of the gap between two members to be welded is large, friction stir welding can be easily carried out.

The above-stated object is attained by a friction stir welding method, wherein a rotary body is rotated and moved while being reciprocated in an orthogonal direction with respect to a welding line between two welding members to be subjected to welding.

The above-stated object is attained by a friction stir welding method, wherein two welding members to be subjected to welding are abutted with a gap, the size of said gap between said two welding members to be subjected to welding is detected, a rotary body is rotated and moved while being reciprocated in an orthogonal direction with respect to a welding line between said two welding members, and when said gap is less than a predetermined value, said reciprocating motion of said rotary body is stopped.

The above-stated object is attained by a friction stir welding method, wherein increased thickness portions of two welding members to be subjected to welding are abutted, each welding member having an increased thickness portion which protrudes from one face at an end portion of said welding member to be subjected to welding, a small diameter portion of a rotary body, which has said small diameter portion at a tip end of a large diameter portion of said rotary body, is inserted in said increased thickness portion of said welding member to an extent that a boundary face between said large diameter portion and said small diameter portion of said rotary body is positioned between an extension line of said face of said one welding member except for said increased thickness portion of said welding portion and an apex of said increased thickness portion of said one welding member, said rotary body is rotated and moved while being reciprocated in an orthogonal direction with respect to a welding line of the two welding members to be subjected to welding.

The above-stated object is attained by a friction stir welding method, wherein, when end portions of two welding members to be subjected to welding, each having an increased thickness portion which protrudes from one face of said end portion of said welding member, are abutted with a gap therebetween, a portion which extends toward said increased thickness portion of another welding member from said increased thickness portion of one welding member is positioned to cover said gap between said two increased thickness portions of said two welding members to be subjected to welding, a small diameter portion of a rotary body, which has said small diameter portion at a tip end of a large diameter portion of said rotary body, is inserted into said abutting portion including said increased thickness portion of said welding member to an extent that a boundary face between said large diameter portion and said small diameter portion of said rotary body is positioned between an extension line of said face of said one welding member except for said increased thickness portion of said welding member and an apex of said increased thickness portion of said welding member, said rotary body is rotated and moved while being reciprocated in an orthogonal direction with respect to a welding line of the two welding members to be subjected to welding.

The above stated object is attained by an apparatus for effecting friction stir welding, comprising a rotation apparatus for rotating a rotary body having a small diameter portion at a tip end of a large diameter portion, a drive mechanism for reciprocating said rotary body, and a movable body for moving said rotation apparatus and said drive apparatus in an orthogonal direction relative to a reciprocating motion of said rotary body.

DESCRIPTION OF THE EMBODIMENTS OF THE INVENTION

One embodiment of a friction stir welding method, which is applied to the welding of two extruded frame members of a car body of a railway vehicle, will be explained with reference to FIG. 1 to FIG. 6.

Figure 6:
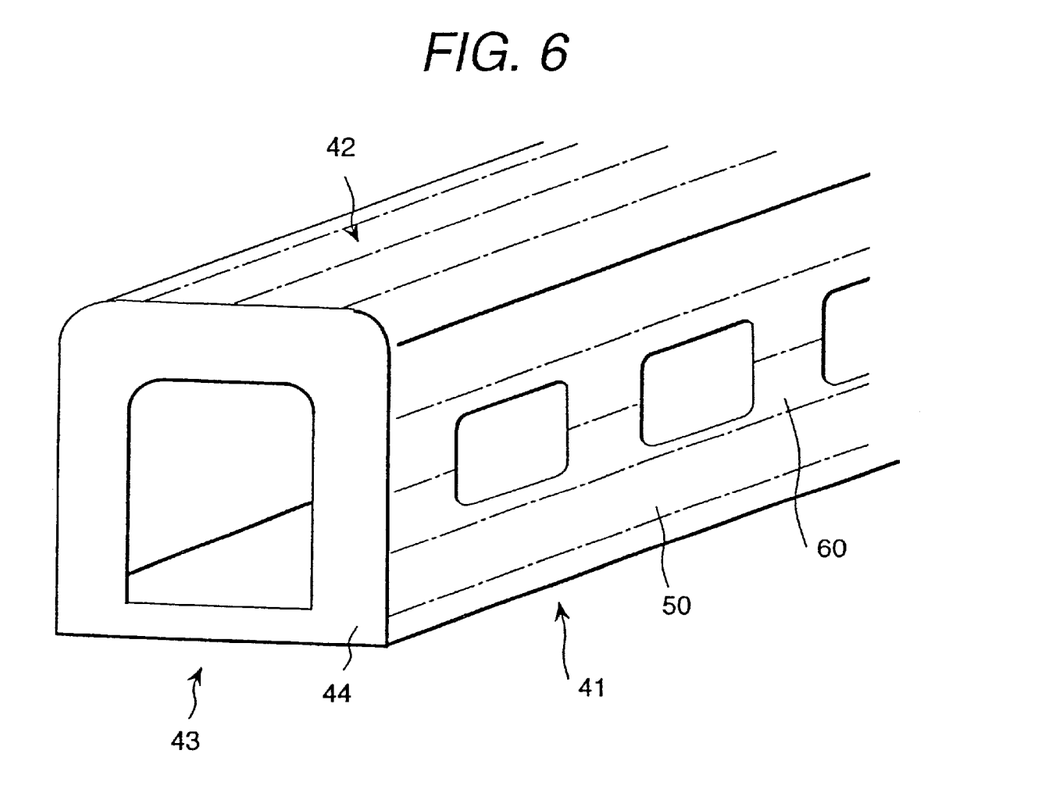
FIG. 6 is a perspective view showing a car body of a railway vehicle having frame members in which the friction stir welding technique of the present invention has been carried out.

In FIG. 6, a car body of a railway vehicle comprises a side body structure 41, a roof body structure 42, a floor body structure 43, and an end body structure 44. The side body structure 41 is constituted by arranging plural extruded frame members 50 and 60 in parallel, which extruded frame members 50 and 60 have been formed using a friction stir welding method according to the present invention.

Figure 1:
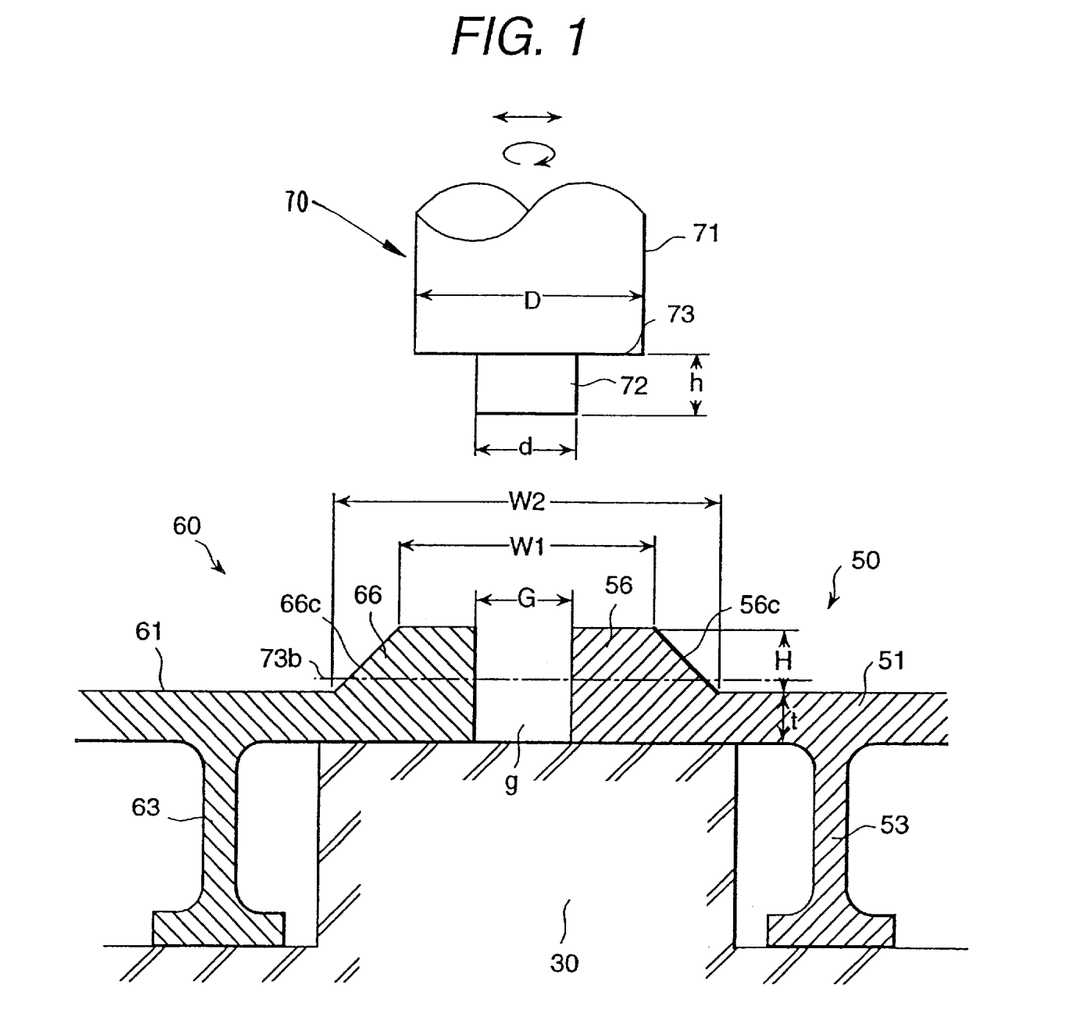
FIG. 1 is a longitudinal view partly in cross-section of a rotary body and a welding portion consisting of two extruded frame members to be welded by carrying out a friction stir welding method according to one embodiment of the present invention.

The friction stir welding method is carried out on the side body structure 41 of the car body of the railway vehicle shown in FIG. 1. The roof body structure 42 and the floor body structure 43 are constituted similarly. A connection between the side body structure 41 and the roof body structure 42 and a connection between the side body structure 41 and the roof body structure 43 are carried out by means of MIG welding, for example.

FIG. 1 shows the welding portion of the extruded frame members 50 and 60 for constituting the side body structure 41 and also a rotary body 70 which is used to carry out the welding. Each of the extruded frame members 50 and 60 is made of an aluminum alloy and is in the form of a long extruded frame member having a longitudinal length of about from 20 m to 25 m, for example. The long extruded frame members 50 and 60 comprise plates 51 and 61 and plural ribs 53 and 63 which are installed on one side of these plates 51 and 61. The sides of the ribs 53 and 63 form an inner side of the car body of the railway vehicle. The ribs 53 and 63 are connected to a conventionally provided post member.

End portions of the plates 51 and 61 of the two extruded frame members 50 and 60, namely the welding portion to be subjected to welding, protrude in a direction opposite to that of the ribs 53 and 63 and form increased thickness portions 56 and 66. The apexes of the increased thickness portions 56 and 66 of the two extruded frame members 50 and 60 are connected to the plates (non-protrusion portions) 51 and 61 through inclined face portions 56c and 66c.

In the friction stir welding method of this embodiment according to the present invention, the welding portion to be subjected to welding includes two opposite parts of the apexes of the increased thickness portions 56 and 66, two opposite vertical end walls of the thickness portions 56 and 66, and two opposite vertical side walls of the plates 51 and 61 which are connected integrally with the two opposite vertical side walls of the thickness portions 56 and 66, for example.

The above stated welding portion to be subjected to welding includes a predetermined interval forming a gap g with a width G or a size (a horizontal direction width) G, which exists before the friction stir welding method is carried out. In this embodiment, the size G of the gap g is 2 mm at the maximum, for example, although the size G of the gap is desirably a small value.

The two extruded frame members 50 and 60 are mounted on a frame stand 30 with the end portions of the welding portion to be subjected to welding being arranged in abutting relationship. Then, the welding portion to be subjected to welding is fixed on the frame stand 30. Next, the extruded frame members 50 and 60 are welded to each other with a predetermined interval at the portions 56 and 66 of increased thickness using the friction stir welding method of the present invention.

With this construction, the interval of the welding portion of the two extruded frame members 50 and 60 is maintained at a predetermined value. Since the interval of the welding portion of the two extruded frame members 50 and 60 is fixed, the two end portions to be subjected to welding are brought into contact (the interval is zero) or the size G of the gap g between the two end portions is minimized. When the size G of the gap g is a small value, the extent of reciprocating movement of the rotary body 70 can be made small, and, as a result, the welding time can be shortened.

However, the size G of the gap g is determined by the manufacturing accuracy of the welding portion of the two extruded frame members 50 and 60. When the end portions of the two extruded frame members 50 and 60 are formed with a wave form along the direction of a welding line (the direction of the extrusion of the frame member or the longitudinal direction of the extruded frame member), it is difficult to fix the extruded frame members 50 and 60 to the frame stand 30 in such a way as to reduce the size G of the gap g. In particular, in the case of forming members of length, such as when the manufacturing accuracy of the two extruded frame members 50 and 60 is inferior, it is difficult to set the size G of the gap g at a predetermined value.

When the size G of the gap g is larger than the diameter d of a small diameter portion 72 of a rotary body 70, it is impossible to carry out the friction stir welding. Even when the size G of the gap g is smaller than the diameter d of the small diameter portion 72 of the rotary body 70, the friction stir welding becomes unsatisfactory when the size G of the gap g is nearly equal to the diameter d of the small diameter portion 72 of the rotary body 70.

The rotary body 70 comprises a large diameter portion 71 and the small diameter portion 72 at a tip end of the large diameter portion 71. The diameter D of the large diameter portion 71 of the rotary body 70 is about 20 mm, for example, and the diameter d of the small diameter portion 72 of the rotary body 70 is 6 mm, for example. The rotary body 70 is inserted from the apex side of the increased thickness portions 56 and 66 of the two extruded frame members 50 and 60 and is rotated. During the insertion of the rotary body 70, the tip end (a lower end) of the small diameter portion 72 of the rotary body 70 approaches the sides of the ribs 53 and 63 (the frame stand 30 side) of the increased thickness portions 56 and 66. The thickness of the plates 51 and 61 is 3.3 mm, for example.

A boundary face portion 73 between the large diameter portion 71 and the small diameter portion 72 of the rotary body 70 is located at a position (a horizontal line) 73b which is outside (on the apex side of the increased thickness portions 56 and 66) of the plane of the outer faces (the faces of the plates 51 and 61 opposite to the ribs 53 and 63) of the plates 51 and 61. In other words, the boundary face portion 73 is not inserted to the extent that it will go beyond the horizontal direction line 73b.

The center of rotation of the rotary body 70 is positioned at an intermediate position (an intermediate portion of the gap g) between the end portions of the two extruded frame members 50 and 60 to be welded. A sensor (not shown in the figure) detects corner portions of the increased thickness portions 56 and 66 of the two extruded frame members 50 and 60 and further detects the size G of the gap g. Then, the center of rotation of the rotary body 70 is positioned at the intermediate position (the welding line) between the corner portions of the increased thickness portions 56 and 66 of the two extruded frame members 50 and 60.

Since the large diameter portion 71 of the rotary body 70 is inserted in the increased thickness portions 56 and 66 of the two extruded frame members 50 and 60, the softened metal from the two extruded frame members 50 and 60 moves toward the gap G, and this metal is used for connecting the extruded frame members 50 and 60 whereby the portion to be subjected to welding is welded fully by the metal. Any excessive metal is blown as a facet.

Figure 2:
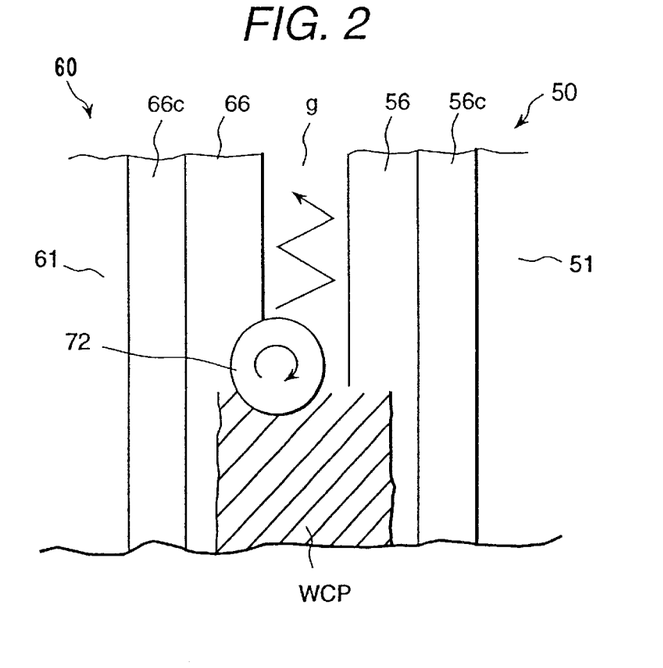
FIG. 2 is a diagram showing a friction stir welding as carried out on two extruded frame members using a rotary body which is moved in a zigzag pattern.

FIG. 1 and FIG. 2 show a case where the size G of the gap g between the extruded frame members 50 and 60 to be welded is large; in other words, the horizontal width of the welding portion to be subjected to welding is large. Under such a condition, the rotary body 70, as stated above, is inserted into the increased thickness portions 56 and 66 of the extruded frame members 50 and 60, while the rotary body 70 is rotated and moved along the gap g (namely, the welding line), causing the extruded frame members 50 and 60 to be welded. At this time, the rotary body 70 is moved in a reciprocating manner in a direction (in FIG. 1, a right and left direction) orthogonal to the welding line. Accordingly, the rotary body 70 is moved in a zigzag pattern as shown in FIG. 2. In this way, friction stir welding is carried out on the welding portion using the rotary body 70.

As stated above, the overlap dimension between the rotary body 70 and one of the increased thickness portions 56 or 66 can be made similar to a case where the size G of the gap g is small. Further, the overlap dimension of the other increased thickness portion 66 or 56 can be made similar to a case where the size G of the gap g is small. As a result, the extruded frame members 50 and 60 can be welded fully according to the friction stir welding method using the zigzag movement of the rotary body 70.

Figure 3:
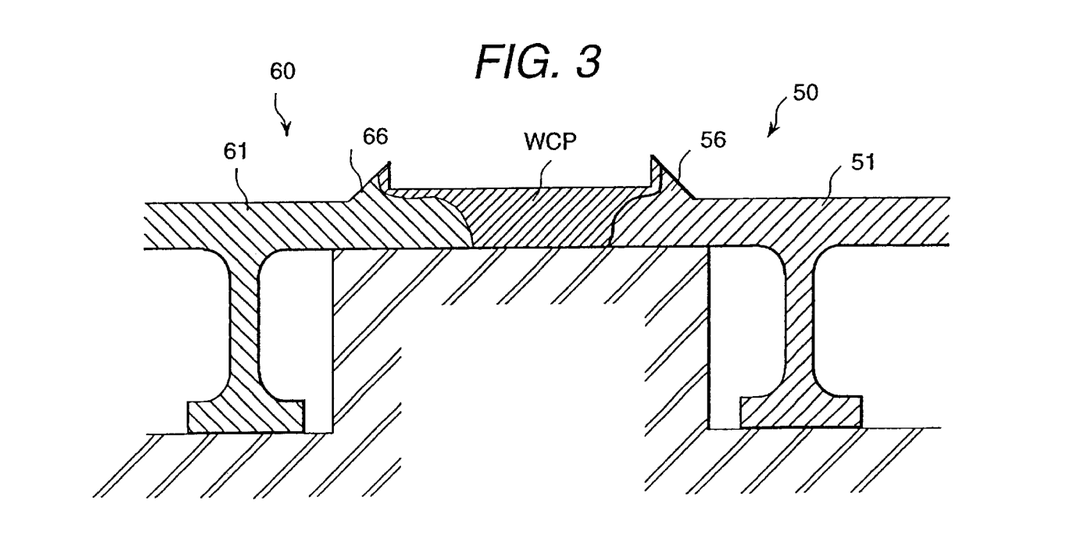
FIG. 3 is a longitudinal cross-section showing two extruded frame members having a welding portion after the friction stir welding technique has been carried out.

The condition of the connection of the extruded frame members 50 and 60 after the friction stir welding is shown in FIG. 3. FIG. 3 shows schematically the two extruded frame members 50 and 60 after they have been joined by the friction stir welding. WCP indicates the welding connection portion in which the metal from the two extruded frame members 50 and 60 is softened by the rotary body 70 and forms the welding connection portion WCP between the two extruded frame members 50 and 60 at the welding portion to be subjected to welding.

After the friction stir welding, the remnants of the increased thickness portions 56 and 66 of the two extruded frame members 50 and 60, as shown in FIG. 3, are cut off to conform to the outer face of the plates 51 and 61 of the two extruded frame members 50 and 60. Accordingly, this smooth outer face can form an outer face of the car body of the railway vehicle, for example.

The dimensions (the largeness) of the increased thickness portions 56 and 66 of the two extruded frame members 50 and 60 to be welded according to this embodiment of the present invention will be explained. In a case where the two increased thickness portions 56 and 66 of the two extruded frame members 50 and 60 are abutted, as shown in FIG. 1, the horizontal width (W1) of the apexes of the increased thickness portions 56 and 66 of the two extruded frame members 50 and 60, in which the width W1 is 12 mm for example, is larger than the diameter d of the small diameter portion 72 of the rotary body 70, but is smaller than the diameter D of the large diameter portion 71 of the rotary body 70. The horizontal width (W2) of the base portion of the two increased thickness portions 56 and 66 of the two extruded frame members 50 and 60, in which the width W2 is 22 mm for example, is larger than the diameter D of the large diameter portion 71 of the rotary body 70, as shown in FIG. 1.

The vertical length h (3.3 mm in this embodiment) of the small diameter portion 72 of the rotary body 70 is larger than the thickness of the plates 51 and 61 of the two extruded frame members 50 and 60. A projection dimension H (1 mm), the width W1 (12 mm) and the width W2 (22 mm) of the two extruded frame members 50 and 60 are determined by taking into consideration the required supplemental amount of the metal relative to the size of the gap g.

The extent to which the rotary body 70 is moved orthogonally (in FIG. 1 and FIG. 2, the right and left direction) to the welding line is determined by the size G of the gap g and the overlap amount between the small diameter portion 72 of the rotary body 70 and the increased thickness portions 56 and 66 of the two extruded frame members 50 and 60. A necessary amount of overlap of the small diameter portion 72 of the rotary body 70 and the increased thickness portions 56 and 66 of the two extruded frame members 50 and 60 is determined from an aspect of the friction stir welding strength.

The reciprocating speed in a direction orthogonal (in FIG. 1 and FIG. 2, the right and left direction) to the welding line of the rotary body 70 is to be larger than the speed of movement along the welding line of the rotary body 70. When the rotary body 70 is moved along the welding line, the speed is determined such that a non-welding portion is not generated as a result of the reciprocating motion of the rotary body 70. For example, the reciprocating speed of the rotary body 70 is typically made two times the moving speed of the rotary body 70 along the welding line.

In this embodiment according to the present invention, the moving speed V1 of the rotary body 70 is 60 cm/min and the rotating speed of the rotary body 70 is 1800 rpm. The reciprocating speed V2 of the rotary body 70 is determined by the moving speed V1 of the rotary body 70, and the reciprocating speed V2 of the rotary body 70 also relates to the size of the gap g. When the size G of the gap is 2 mm, the reciprocating speed V2 of the rotary body 70 is about 1.5–3 times, desirably about 2–3 times, the moving speed V1.

When the size G of the gap g is smaller than a predetermined value, it is unnecessary to carry out the reciprocating movement of the rotary body 70. By detecting the size G of the gap g using a sensor, the necessity of providing the reciprocating motion of the rotary body 70 is determined. Accordingly, when the size G of the gap g is small, if the reciprocating motion of the rotary body 70 is stopped, in comparison with the case of providing reciprocating motion of the rotary body 70, the exothermic heat produced by the friction stir welding can be reduced.

Further, when the size G of the gap g is small, the moving speed of the rotary body 70 along the welding line can be made large. Further, when the size G of the gap g is larger than the size of the gap g for which it is unnecessary to carry out reciprocating motion, but is not quite so large as the case where the size of the gap g can be considered large, the moving speed of the rotary body along the welding line can be made large.

Figure 4:
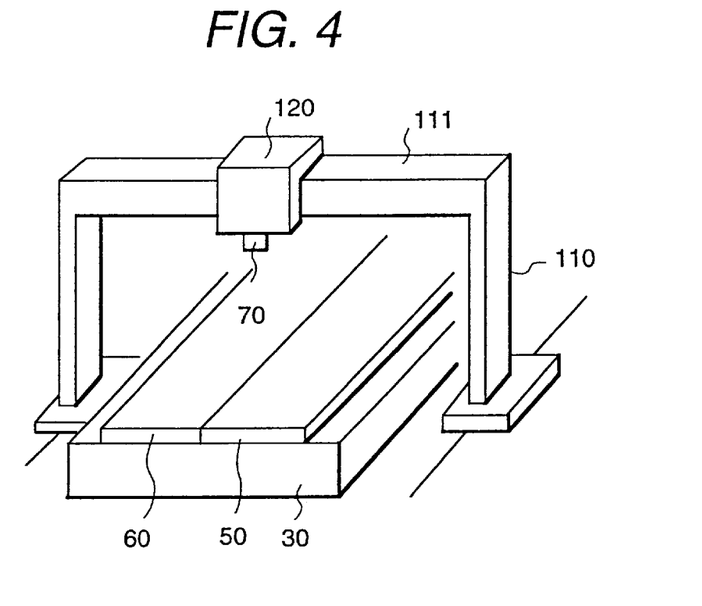
FIG. 4 is a perspective view showing a friction stir welding apparatus for carrying out welding on two extruded frame members using a rotary body according to one embodiment of the present invention.
Figure 5:
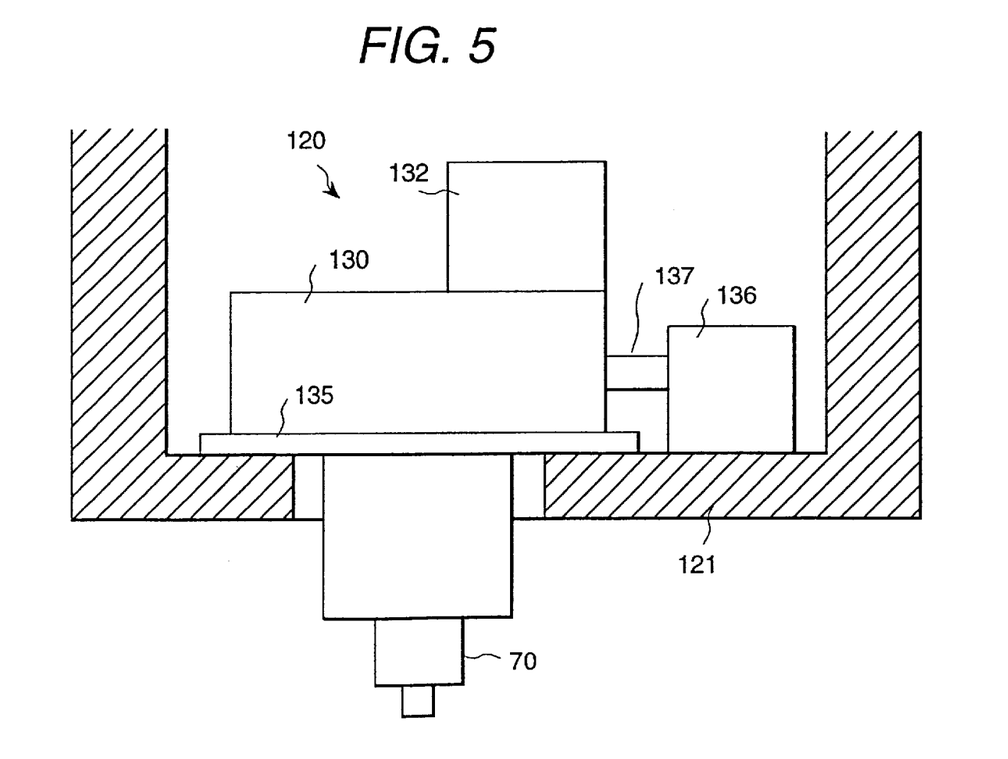
FIG. 5 is a longitudinal cross-sectional view showing the friction stir welding apparatus having the rotary body-shown in FIG. 4.

FIG. 4 and FIG. 5 show a friction stir welding apparatus for carrying out friction stir welding according to the present invention. The rotary body 70 is installed on a gate type running gantry 110 which extends over the extruded frame members 50 and 60, which are fixed on the frame stand 30. The running body 110 moves at a predetermined speed in the longitudinal direction of the extruded frame members 50 and 60. A friction stir welding apparatus 120 having the rotary body 70 is installed on a beam member 111 of the running gantry 110. The friction stir welding apparatus 120 detects the increased thickness portions 56 and 66 of the extruded frame members 50 and 60 using a sensor and moves along the beam member 111 to a position at a center of the gap g.

The friction stir welding apparatus 120 comprises a frame stand 121 through which the beam member 111 runs, a rotation drive apparatus 130 for rotating the rotary body 70, a rail member 135 on which the rotation drive apparatus 130 moves freely, and a drive apparatus 136 for reciprocating the rotation drive apparatus 130 in a horizontal direction. The drive apparatus 136 is installed on the frame stand 121 and is connected to the rotation drive apparatus 130 through a joint member 137. The rotation drive apparatus 130 comprises an electric drive motor 132 and a reduction gear arrangement.

The frame stand 121 is installed on a running body (not shown in figure) which runs on the beam member 111, and the height of the frame stand 121 can be varied. To the bottom of the frame stand 121, rollers (not shown in figure) are hung which press down on the plates 51 and 61 in the vicinity of the increased thickness portions 56 and 66. The extruded frame members 50 and 60 are caused to adhere closely to the frame stand 30 by the action of these rollers.

Further, a metal cutting-off machine (for example, an end mill machine) is installed on the frame stand 121 and is positioned at a rear portion of the rotary body 70. The remnants of the increased thickness portions 56 and 66 on which the friction stir welding has been completed are cut off by this metal cutting-off machine.

In the above-described embodiment, the increased thickness portions 56 and 66 are provided so as to protrude or project from the face of the plates 51 and 61 in a direction which is opposite to that of the ribs, however the increased thickness portions 56 and 66 may protrude or project from the same side as that of the ribs 53 and 63. In this case, a side having no ribs is mounted on the frame stand 30. Further, the extruded frame members 50 and 60 may take the form of a hollow frame member.

Figure 7:
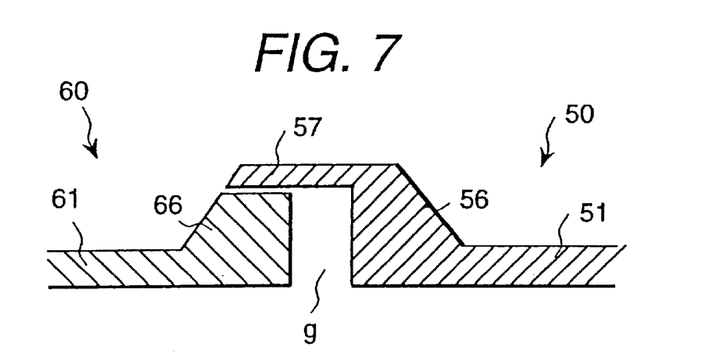
FIG. 7 is a longitudinal cross-sectional view showing an essential portion of two extruded frame members having a welding portion to be subjected to welding using a friction stir welding method according to another embodiment of the present invention.

In another embodiment of a friction stir welding method according to the present invention, as shown in FIG. 7, a tip end 57 of the increased thickness portion 56 of the extruded frame member 50 is extended toward and over a side of the other extruded frame member 60 so as to cover an upper portion of the gap g. When the size G of the gap g is small, the extending tip end 57 overlaps the apex of the increased thickness portion 66. Accordingly, the extrusion of the metal into the gap g can be carried out easily.

Figure 8:
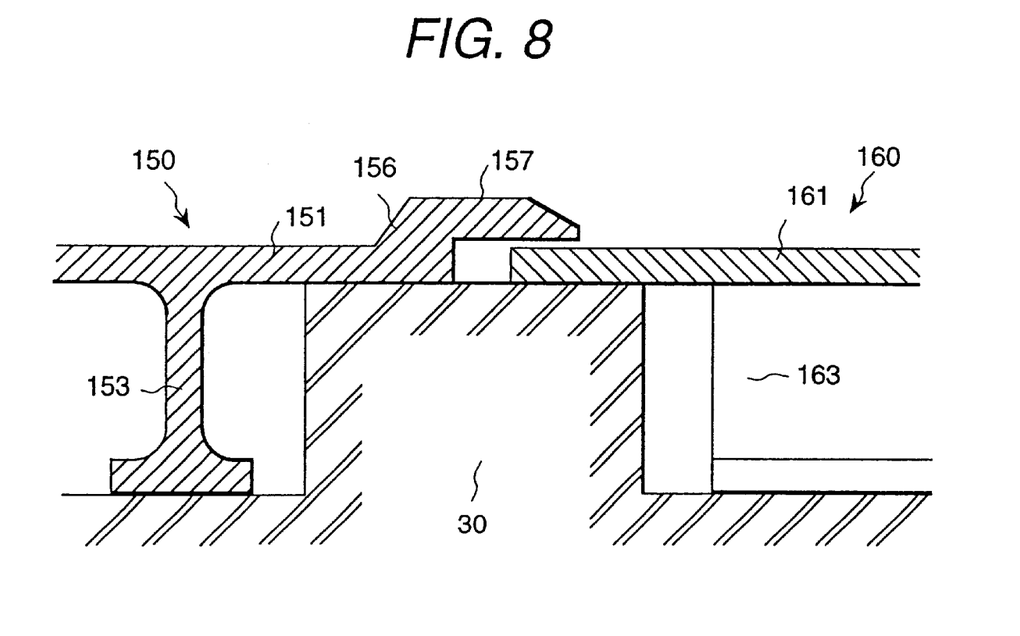
FIG. 8 is a longitudinal cross-sectional view showing an essential portion of two extruded frame members having a welding portion to be subjected to welding using a friction stir welding method according to a further embodiment of the present invention.
Figure 9:
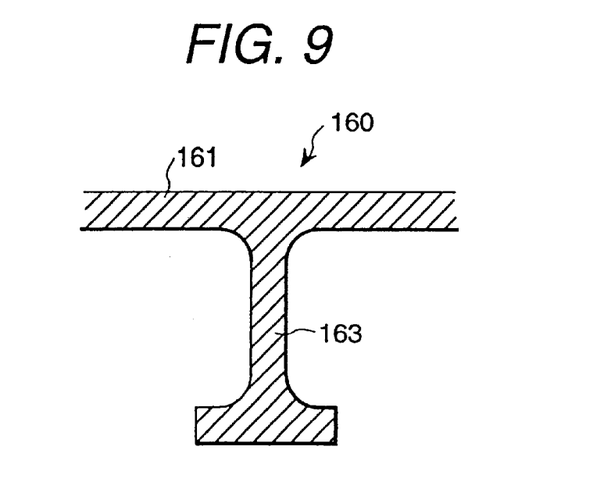
FIG. 9 is a right side view showing one frame member to be welded having a rib shown in FIG. 8.

In the case of a further embodiment of a friction stir welding method according to the present invention, as shown in FIG. 8 and FIG. 9, the extrusion directions of the two extruded frame members 150 and 160 are orthogonal. FIG. 8 shows a condition before the friction stir welding. Ribs 153 and 163 are provided on one side of the respective extruded frame members 150 and 160. An end portion of the extruded frame member 150 constitutes an increased thickness portion 156. The increased thickness portion 156 projects toward and over the extruded frame member 160 to be welded and constitutes an extending tip end 157.

The dimension of the extending tip end 157 is such that it overlaps the plate 161 of the extruded frame member 160 when the size G of the gap g is small. When the size G of the gap g is large, the extending tip end 157 extends to the plate. The extending tip end 157 corresponds in function to the extending tip end 57 in the embodiment of FIG. 7. The rib 163 at the vicinity of the extruded frame member is cut off and removed. The extending tip end 157 is formed with a sloping surface similar to the increased thickness portion 156.

With the above stated construction, by inserting the rotary body 70 from above, the friction stir welding is carried out, since the extending tip end 157 exists at the upper portion of the gap g between the two extruded frame members 150 and 160, and the metal of the extending tip end 157 and portion 156 is supplied to the gap g. Further, metal is supplied to the upper portion of the extruded frame member 160. Accordingly, in comparison with a structure in which there is no extending tip end 157, a good friction stir welding can be obtained.

The above stated friction stir method and the above stated friction stir welding apparatus can be applied to the welding of conventional honeycomb panels to each other. The honeycomb panel comprises two face plates, a honeycomb shaped core member disposed between the two face plates and an edge member arranged at a periphery of the core member. A member to be subjected to welding can also include pipes etc. In this case, the elements such as the plate provided in the above stated embodiments can suitably be replaced by a tube, for example.

The technical range according to the present invention should not be limited to the embodiments described herein or the particular means for solving the problems of the prior art as described in this specification.

According to the present invention, even when the size of the gap between two members to be welded is large, a full friction stir welding can be attained using the friction stir welding method and the apparatus for carrying out the friction stir welding according to the present invention.

What is claimed is:

1. A method of friction stir welding, comprising:
abutting increased thickness portions of two members to be subjected to welding, each member having an increased thickness portion which protrudes from one face thereof at an end portion of said member to be subjected to welding;
including a small diameter portion of a rotary body, which has said small diameter portion at a tip end of a large diameter portion, into said increased portions of said members to be subjected to welding to an extent that a boundary face between said large diameter portion and said small diameter portion of said rotary body is positioned between an extension line of said one face of said members to be subjected to welding, including said increased thickness portions, and an apex of said increased thickness portions of said members to be subjected to welding; and
rotating and moving said rotary body along a welding line while reciprocating said rotary body in a direction orthogonal to said welding line between the two members to be subjected to welding.

2. A method of friction stir welding, comprising:
positioning end portions of two members to be subjected to welding so as to abut each other with a gap therebetween, each end portion having an increased thickness portion which protrudes from one face of said end portion of the member to be subjected to welding, said "thick" increased thickness portion of the other member so as to cover said gap between said two increased thickness portions of said two members to be subjected to welding,
inserting a small diameter portion of a rotary body, which has said small diameter portion at a tip end of a large diameter portion, into said increased thickness portions of said members to be subjected to welding to an extent that a boundary face between said large diameter portion and said small diameter portion of said rotary body is positioned between an extension line of said one face of said members to be subjected to welding, excludes said increased thickness portion of said welding member to be subjected to welding portions, and an apex of said increased thickness portions of said members to be subjected to welding; and
rotating and moving said rotary body along a welding line while reciprocating said rotary body in a direction orthogonal to said welding line between the two members to be subjected to welding.

3. A method of friction stir welding, comprising:
positioning an end portion of a first member to be subjected to welding and an end portion of a second member to be subjected to welding in abutting relationship with a gap therebetween so that an increased thickness portion which projects from one face of said first member extends to said end portion of said second member over said gap,
inserting a small diameter portion of a rotary body, which has said small diameter portion at a tip end of a large diameter portion into said increased thickness portion to an extent that a boundary face between said large diameter portion and said small diameter portion of said rotary body is positioned between an extension line of said face of said first welding member, excluding said increased thickness portion; and
rotating and moving a rotary body along a welding line while reciprocating said rotary body in a direction orthogonal to said welding line between the two members to be subjected to welding.

4. A method of a friction stir welding for joining juxtaposed extruded frame members each having plural ribs only on one face of a plate, wherein, at an end portion of said plate, said extruded frame members have an increased thickness which projects from one face of said plate, and one of aid extruded frame members has a protrusion which extends from a side of an apex of said increased thickness portion to the end portion of the other extruded frame member, the method comprising:
rotating and moving a rotary body along a welding line while reciprocating said rotary body in a direction orthogonal to said welding line between said extruded frame members to subject said frame members to welding along said welding line.

5. A method of a friction stir welding for joining frame members, comprising:
abutting increased thickness portions of two frame members to be subjected to welding so that a gap remains therebetween, each of said increased thickness portions being provided on an portion of a respective one of said two frame members to be subjected to welding; and rotating and moving a rotary body along a welding line while reciprocating said rotary body in a direction orthogonal to said welding line between said two frame members to subject said frame members to welding at said increased thickness portion.

6. A method of friction stir welding for joining frame members, comprising:

abutting increased thickness portion of two frame members to be subjected to welding so that a gap remains therebetween, each of said increased thickness portions being provided on an end portion of a respective one of said two frame members to be subjected to welding;

detecting the size of said gap between said two frame members to be subjected to welding;

rotating and moving a rotary body along a welding line while reciprocating said rotary body in a direction orthogonal to said welding line between said two frame members to subject said frame members to welding at said increased thickness portions; and when said size of said gap is less than a predetermined value, not carrying out said reciprocating motion of said rotary body.

* * * * *